(12) United States Patent
O'Neill (10) Patent No.: US 11,094,294 B2
(45) Date of Patent: Aug. 17, 2021

(54) MOVEMENT BASED GRAPHICAL USER INTERFACE

(71) Applicant: PAYPAL, INC, San Jose, CA (US)

(72) Inventor: Megan Marie O'Neill, Santa Cruz, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/196,932

(22) Filed: Nov. 20, 2018

(65) Prior Publication Data

US 2019/0295506 A1  Sep. 26, 2019

Related U.S. Application Data

(63) Continuation of application No. 14/731,362, filed on Jun. 4, 2015, now Pat. No. 10,134,368.

(51) Int. Cl.
| | |
|---|---|
| G09G 5/30 | (2006.01) |
| G06F 1/16 | (2006.01) |
| G06F 3/0346 | (2013.01) |
| G06F 3/0484 | (2013.01) |
| G06F 3/01 | (2006.01) |
| G06F 3/147 | (2006.01) |
| G06F 3/0488 | (2013.01) |

(52) U.S. Cl.
CPC ............... *G09G 5/30* (2013.01); *G06F 1/163* (2013.01); *G06F 1/1684* (2013.01); *G06F 1/1694* (2013.01); *G06F 3/015* (2013.01); *G06F 3/017* (2013.01); *G06F 3/0346* (2013.01); *G06F 3/0488* (2013.01); *G06F 3/04845* (2013.01); *G06F 3/04847* (2013.01); *G06F 3/147* (2013.01); *G09G 2354/00* (2013.01); *G09G 2370/16* (2013.01)

(58) Field of Classification Search
CPC .... G06F 3/014; G06F 3/0488; G06F 3/04886; G06F 3/04817; G09G 5/30; G09G 5/373
USPC .................................................. 482/8, 9, 14
See application file for complete search history.

(56) References Cited

U.S. PATENT DOCUMENTS

| | | | |
|---|---|---|---|
| 8,875,061 B1 * | 10/2014 | Lee ....................... | G06F 3/0487 715/790 |
| 2004/0196259 A1 | 10/2004 | Bradski | |
| 2008/0218475 A1 | 9/2008 | Appleyard et al. | |
| 2008/0254837 A1 * | 10/2008 | Klinghult .......... | H04M 1/72594 455/566 |

(Continued)

FOREIGN PATENT DOCUMENTS

WO   WO 2014/054210 A2   4/2014

*Primary Examiner* — Yuzhen Shen
(74) *Attorney, Agent, or Firm* — Haynes and Boone, LLP (57) ABSTRACT

A system or a method may be provided that may detect a movement or activity of a user via the user's mobile and/or wearable devices. The system may adjust the display interface based on the user's detected movement or activity. When a user is very active (biking or jogging), the user may have very limited amount of time or attention to interact with a display interface. The movement or activity of the user may be detected by a motion detection device installed on the mobile device or on the wearable device. When the user is active, the display interface may adjust to enlarge the information to make it easier for the user to view, read, or interact with. The system may also select and display important information, without other peripheral information (less important information) when the user is active.

20 Claims, 6 Drawing Sheets

(56) References Cited

U.S. PATENT DOCUMENTS

| | | |
|---|---|---|
| 2010/0146444 A1 | 6/2010 | Wang et al. |
| 2011/0261079 A1* | 10/2011 | Ingrassia, Jr. ...... A63B 71/0622 |
| | | 345/665 |
| 2012/0041767 A1* | 2/2012 | Hoffman ............ A63B 24/0062 |
| | | 705/1.1 |
| 2012/0081281 A1* | 4/2012 | Morichika ........... G01C 21/367 |
| | | 345/156 |
| 2013/0238287 A1 | 9/2013 | Hoffman et al. |
| 2013/0339852 A1 | 12/2013 | Poornachandran et al. |
| 2014/0172362 A1 | 6/2014 | Burton et al. |
| 2014/0176422 A1 | 6/2014 | Brumback et al. |
| 2014/0288680 A1 | 9/2014 | Hoffman et al. |
| 2014/0375817 A1 | 12/2014 | Meschter et al. |
| 2015/0087275 A1* | 3/2015 | Brisebois ................ H04W 8/22 |
| | | 455/414.1 |

\* cited by examiner

MOVEMENT BASED GRAPHICAL USER INTERFACE

RELATED APPLICATIONS

This application is a continuation of Ser. No. 14/731,362, filed Jun. 4, 2015, which is incorporated herein by reference in its entirety.

FIELD OF THE INVENTION

The present invention generally relates to graphical user interfaces, and more particularly, to systems and methods for implementing movement based graphical user interfaces.

RELATED ART

With the popularity of mobile computing, consumers increasingly are using mobile devices to conduct various transactions and interactions. For example, consumers may shop, make electronic payments, and/or communicate electronically via mobile devices, such as a smart phone. However, mobile devices, by the nature of their compact size and portability, have small displays. Due to the movements of the users, the users may have difficulty viewing and/or interacting with the contents displayed on the small displays. As such, certain functions of the mobile device may become unusable when the user's movements cause the contents on the display difficult to read and/or select. Therefore, there is a need for a system and/or a method that provides dynamic movement based display interface.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or a method may be provided that may detect a movement or activity of a user via the user's mobile and/or wearable devices. The system may adjust the display interface based on the user's detected movement or activity. For example, when a user is very active (biking or jogging), the user may have very limited amount of time or attention to interact with a display interface. When the user stops or is at rest, the user may have more time or attention for interacting with the display interface. For example, when the user is active, the display interface may adjust to enlarge the information to make it more prominent. The system may also select and display important information, without other peripheral information (less important information), where "important" information may be the same for all users or it may be user or transaction specific. This may optimize the user experience on mobile or wearable devices.

In an embodiment, the movement or activity of the user may be detected by a motion detection device installed on the mobile device or on the wearable device. The motion detection device may include one or more types of motion detection sensors, such as an accelerometer, a gyroscope, a compass, a barometer, a Global Positioning System (GPS), and the like. Thus, the movement and/or activity of the user, such as device orientation, speed, acceleration, direction, location, altitude, and the like, may be detected by one or more of the user's mobile and/or wearable devices in real time. In some embodiments, the movement or activity of the user may be determined based on the movement of the user detected at a combination of different devices, such as a smart phone and a smart watch.

The system may determine the user's movement and activity based on sensor data collected from the various movement detection devices. For example, the system may determine that the user is jogging based on the movement of the smart watch worn on the user's wrist and the speed of the user detected by the user's smart phone located in the user's pocket. The system may then select the display style and format for the detected movement or activity of the user. For example, the system may select a simple format showing only brief and important information to the user while the user is jogging. When the user stops or is at rest, the system may select a display format that shows greater details.

In an embodiment, the system may provide a user interface that allows the user to designate or customize the user's display preferences. The user may select the style, format, or content of display information at different types of movements, speeds, or activities. In some embodiments, the system may learn the user's display preferences based on the user's interactions with the display interface. For example, the system may detect that the user typically performs display enlargement or zoom in when the user is jogging, because the user cannot see the display information clearly on the user's smart phone. Thus, the system may learn and remember to automatically display larger fonts when the system detects that the user is jogging. Accordingly, the system may continuously learn and update the user's display preferences based on the user's interaction with the display interface.

In an embodiment, a display profile may be established to store the user's display preferences for different movements or activities of the users. The display profile also may designate the user's display preferences for different devices and/or different applications. For example, the display profile may store the user's display preferences for a smart watch, a smart phone, and a tablet computer each with different display preferences for different movements or activities of the user.

In an embodiment, the system may adjust the format, style, and content of display information based on the speed of the user. In some embodiments, the system may adjust the display based on the movement, posture, and gesture made by the user. In some embodiments, the system may adjust the display based on the location, altitude, and travel direction of the user. In some embodiments, the system may collect other environmental information, such as temperature, humidity, altitude, or the like to provide context for adjusting the display. In some embodiments, the system may collect user's biometric readings detected by biometric sensors, such as heart rate, body temperature, skin conductance, and the like, and may use the biometric information for adjusting the display.

Figure 1:
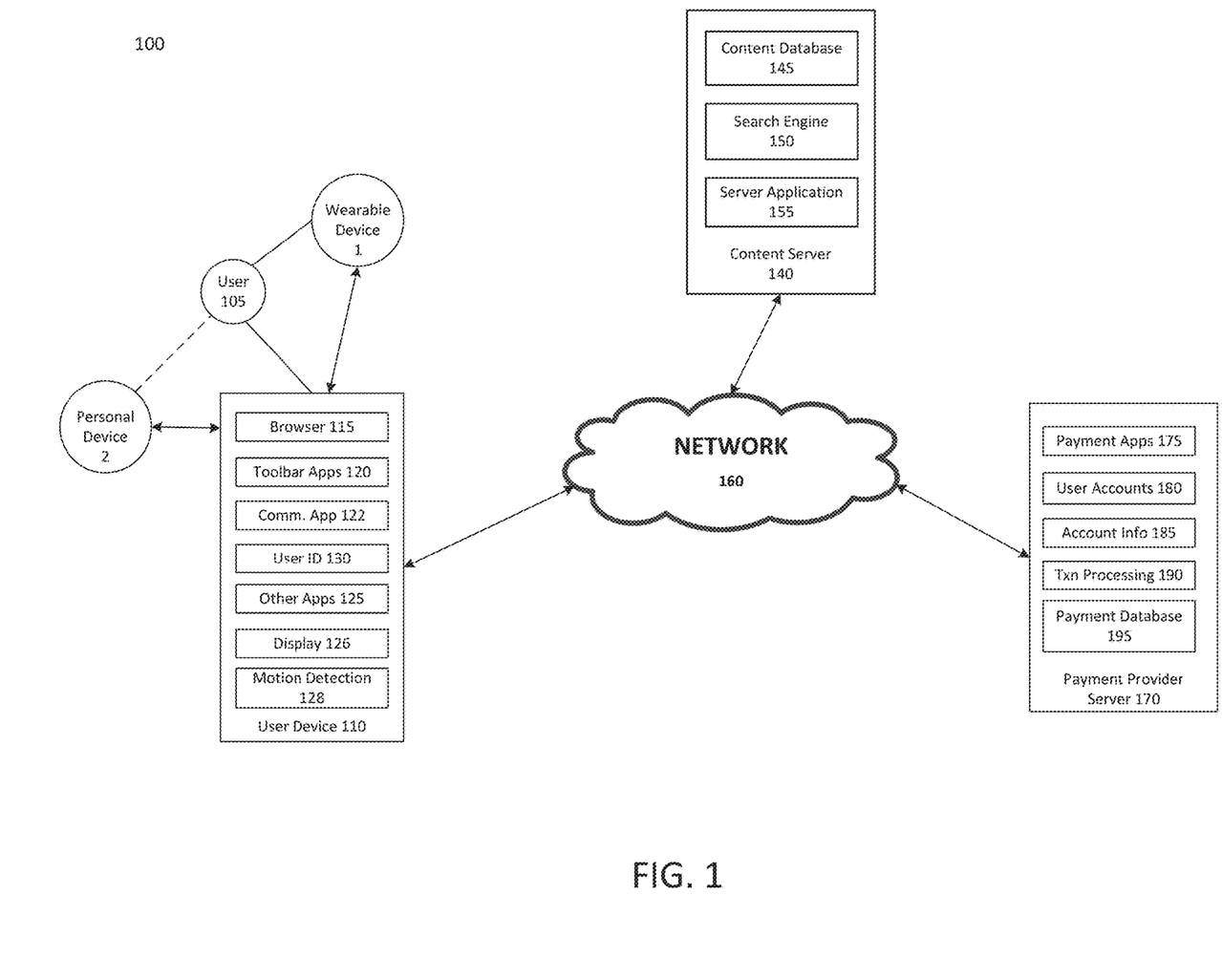
FIG. 1 is a block diagram of a networked system suitable for implementing movement based display interface according to an embodiment.

FIG. 1 is a block diagram of a networked system suitable for implementing movement based display interface according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a content server 140, and a payment provider server 170 in communication over a network 160. A wearable device 1 may be worn by user 105 and may communicate with user device 110. A personal device 2, such as a laptop computer, a tablet, a car console of the user 105's car, or any devices associated with the user 105 also may communicate with user device 110. Payment provider server 170 may be maintained by a payment service provider, such as PayPal, Inc. of San Jose, Calif., a bank, a credit card company, and etc. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account.

In some embodiments, the user 105 may have a payment account at the payment provider server 170. The payment account may allow user 105 to purchase and/or pay for various products or services at a merchant. The user 105 may be required to enter credentials for user authentication at the user device 110 to access and use the payment account.

User device 110, content server 140, payment provider server 170, wearable device 1, and personal device 2 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a short distance communication device, such as a Bluetooth device or a Near-Field Communication (NFC) device configured to communicate with other devices located near the user device 110. The Bluetooth device may implement low energy Bluetooth (BLE) communication. For example, user device 110 may communicate with wearable device 1 or personal device 2 via BLE or NFC communication to provide and receive information for various functions provided by the wearable devices or personal devices.

User device 110 may include a display 126 configured to display information to the user 105. The display 126 may include an electronic display, such as a Liquid Crystal Display (LED), an electronic paper display, or the like. The display 126 may be a touch screen configured to receive user's input by touch and gesture on the surface of the display 126. User device 110 also may include motion detection device 128 configured to detect a movement of the user device 110. The motion detection device 128 may include one or more of a location detection device (GPS), a gyroscope, an accelerometer, a compass, a barometer, and the like. Thus, the motion detection device 128 may detect a movement or an activity of the user 105 who carries the user device 110.

Content server 140 may be maintained, for example, by an online content provider, such as a web hosting service provider. Content server 140 may include a content database 145 identifying available content and information which may be made available for viewing, interacting with, or listening by user 105. For example, content database 145 may include a content index accessible by search engines. Content server 140 also may include a search engine 150 configured to search for relevant content or information requested by the user 105. In one embodiment, user 105 may interact with the search engine 150 through browser applications over network 160 in order to search and view various content and information identified in the content database 145. User 105 may use user device 110, wearable device 1, or personal device 2 to send search queries to content server 140. In response, content server 140 may search for content and return search results to user device 110. Content server 140 also may include a server application 155 configured to facilitate various functions of the content server 140, such as indexing, storing, updating, and managing various content.

Payment provider server 170 may be maintained, for example, by an online payment service provider, which may provide payment between user 105 and a merchant. In this regard, payment provider server 170 includes one or more payment applications 175 which may be configured to interact with user device 110 and/or a merchant's server (not shown) over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information, which may be used to facilitate online transactions by user 105. In an embodiment, the account information 185 also may include display profile storing display preferences of the user 105. The display preferences may include the user's preferences for how information is displayed at the user device 110, the wearable device 1, and/or the personal device 2 based on the movement or activity of the user 105.

A transaction processing application 190, which may be part of payment application 175 or separate, may be configured to receive information from user device 110 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

The payment provider server 170 and/or the content server 140 may electronically transmit information (content requested by the user 105 or payment related information) to the user device 110 to be displayed on the user device 110, the wearable device 1 or the personal device 2. The information may be formatted based on the user 105's movement or activity. For example, the user's movement and/or activity may be detected by movement detection devices in the user device 110, the wearable device, or the personal device 2. The system may format the information to be displayed based on the user 105's movement or activity to display easily readable information to the user 105.

In an embodiment, the sensor data generated from detecting the user 105's movement or activity may be transmitted from the user device 110 to the payment provider server 170 or the content server 140 via the network 160. The payment provider server 170 or the content server 140 may then format the content to be displayed at the user device 110 or at the wearable device 1 or personal device 2 based on the detected movement or activity of the user 105. The payment provider server 170 or the content server 140 may then communicate the formatted content to the user device 110 to be displayed. In another embodiment, the payment provider server 170 or the content server 140 may communicate the content to the user device 110 and the user device 110 may formulate the content based on the user 105's movement or activity for display at the user device 110 or at the wearable device 1 or the personal device 2.

Figure 2:
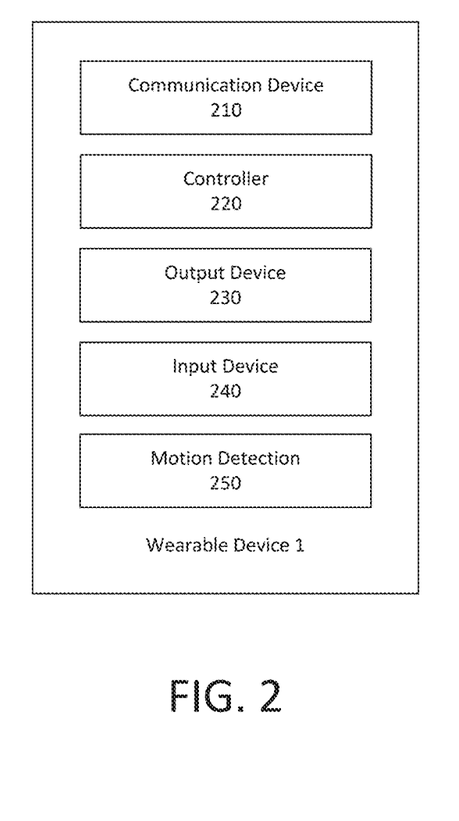
FIG. 2 is a block diagram of a wearable device suitable for implementing movement based display interface according to one embodiment.

FIG. 2 is a block diagram of a wearable device 1 suitable for implementing movement based display interface according to one embodiment. Wearable device 1 may be a wearable item that may be worn by the user 105 or be attached to the user 105 or other items carried by the user 105. As such, the wearable device 1 may be a personal item to the user 105 that is worn or carried by the user 105. The wearable device 1 may include a communication device 210 configured to communicate with other devices. The communication device 210 may include a short-range communication device, such as a Bluetooth or Bluetooth Low Energy (BLE) communication device, a Near-Field Communication (NFC) device, WiFi, or a combination thereof.

The wearable device 1 may include a controller 220 configured to manage and control various operations of the wearable device 1. The controller 220 may include a microprocessor, an integrated circuit, or a combination thereof. The controller 220 may make determinations or decisions regarding controlling the operations of other devices, such as a communication device 210 and/or the output device 230. For example, the controller 220 may control the communication device 210 to communicate with the user device 110.

The wearable device 1 may include an output device 230 configured to communicate with user 105. For example, output device 230 may be an audio signal emitter configured to emit audio signals to the user 105. In another example, output device 230 may be an LED component configured to provide visual output. In still another example, output device 230 may be a vibration device configured to vibrate to communicate with user 105. In some embodiments, output device 230 may include one or more types of different output devices, such as a combination of an LED component and an audio signal emitter to provide different types of outputs to the user 105. In some embodiments, the output device 230 may be provided at the user device 110 at which various information is communicated to the user 105.

The wearable device 1 may also include an input device 240 configured to receive input from the user 105. The input device 240 may receive instructions from the user 105, such as a touch screen, buttons, dials, and the like. The input device 240 also may include sensors configured to detect user 105 or user 105's biometric information, such as fingerprint, heart rate, skin conductance, body temperature, and the like. The biometric information may be used to determine user movement and activity. The wearable device 1 may include a motion detection device 250. The motion detection device 250 may include one or more of an accelerometer, gyroscope, barometer, and the like. Thus, the motion detection 250 may detect the user 105's movement, posture, and/or gesture.

The wearable device 1 may be powered by a battery, which may be a rechargeable battery. For example, the wearable device 1 may be powered by solar battery or by kinetic energy, such as the movement of user 105. In another example, the wearable device 1 may be powered by replaceable batteries. In some embodiments, the wearable device 1 may include low power components, such as e-ink display, that require very little battery.

Personal devices, such as personal device 2, may include similar components as those of wearable device 1. Personal devices may connect and/or communicate with user device 110 when the personal devices are in close proximity to the user device 110. For example, personal devices may include the wearable devices, a car, a desktop computer, a laptop computer, a tablet computer, a camera, a printer, and any other devices that are configured to connect with user device 110 when in proximity to the user device 110.

Figure 3A:
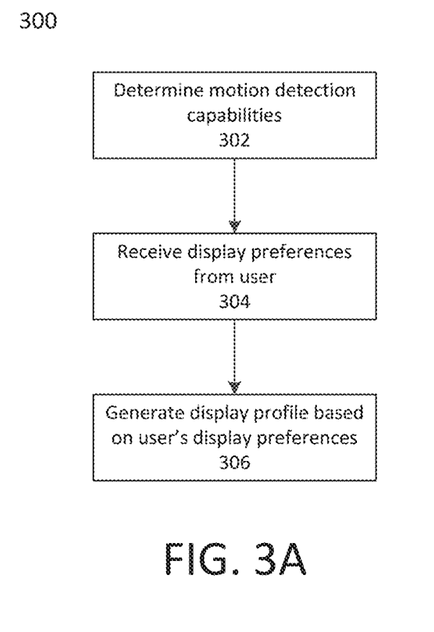
FIG. 3A is a flow chart illustrating a set up process for implementing movement based display interface according to one embodiment.

FIG. 3A is a flow chart illustrating a set up process 300 for implementing movement based display interface according to one embodiment. Initially, the user 105 may set up a user account. Process 300 may be implemented by the user device 110, the content server 140, or the payment provider server 170, or any combination thereof. At step 302, the system may determine motion detection capabilities available for detecting the user 105's movements and activities. The system may detect, via the user device 110, wearable devices and personal devices carried by the user 105. Movement detection devices available in the various devices carried by the user 105 may be communicated electronically to the system via the user device 110. For example, the user 105 may register personal or wearable devices. The user 105 may enter the type and name of wearable devices the user 105 uses and/or connects to the user device 110. In an embodiment, the user device 110 may automatically compile a list of the user 105's personal or wearable devices that have or had been connected to the user device 110 and send the list to the system to be associated with the user 105's user account.

Each wearable or personal device may be carried by the user 105 differently to provide different types of movement detection. For example, a smart watch is worn on the user 105's wrist and may be configured to detect movement of the user's wrist. In another example, the user 105's a smart phone is typically carried in the user 105's pocket or the user's purse or bag. As such, the smart phone may detect the overall body movement of the user 105. In still another example, the user 105's car may have a console that detects the speed, acceleration, location, and travel direction of the car. A user interface may be provided to allow the user 105 to enter the type of wearable devices or personal devices that are available for detecting the user 105's movements or activities. In some embodiments, the system may determine the motion detection capabilities of various devices based on their make and model.

At step 304, the system may receive display preferences from the user 105. The system may provide a user interface at the user device 110 that allows the user 105 to enter the user 105's display preferences. The user 105 may select whether movement based display features should be activated. The user 105 may also select the display or display device at which the movement based display features should be activated. For example, the user 105 may select to activate the movement based display features for both the user device 110 and the user 105's smart watch. As such, the display devices on these two devices may adjust or change the display interface based on the user 105's movement and activity in real time. In some embodiments, the system may automatically select devices that have smaller display size and that may be difficult to view when the user 105 is moving or is active. For example, the system may automatically select the smart watch which has smaller screen size for implementing movement based display interface.

In some embodiments, the user 105 may select applications that the movement based display interface may be implemented. For example, the user 105 may select particular applications installed on the user device 110, such as a payment application or a navigation application, at which the movement based display interface may be implemented when the user 105 is using the selected application. In some embodiments, the system may automatically select applications that are likely to be used when the user is moving or active for implementing the movement based display interface. For example, the user is likely to use a navigation application when driving or a workout application when jogging or exercising. The system may automatically select these applications for implementing movement based display interface. In contrast, the user is likely to be at rest or relatively still when the user is using a reading application or the like.

In an embodiment, the system may allow the user 105 to customize the format and style of the display at different movement or activity levels. In particular, the user 105 may select the text sizes, colors, image sizes, content, and other display features for different levels of movements and activities. For example, the user 105 may select larger text sizes with higher level of movement or activities. When the user 105 is running faster, the text size may increase to help the user 105 see the text. When the user 105 is driving faster, content may be brief to help the user 105 stay focused on the road. In some embodiments, the system may automatically select the format and style of the display interface for the user 105. For example, the system may select the display settings that are popular among other similar users.

At step 306, the system may generate a display profile based on the user's display preferences as selected by the user 104 and/or determined by the system. The display profile may indicate whether the movement based display interface is activated and for which devices and/or applications. The display profile also may designate display interface settings for different movements or activities. For example, different display devices may have different display formats and styles. For example, for each display device, different movement and activity levels may have different display formats and styles, including different text size, content, color, image size, and the like.

Further, the display profile may store a user's preference of how content is displayed to the user. As such, the content may be different between two different users moving at exactly the same rate/acceleration at the same location based on what is importance to the user. For example, User A may be more interested in details of an item. As such, User A's display profile may indicate that content related to a picture or description may be enlarged. User B may be more interested in purchasing the item. As such, User B's display profile may indicate that content related to pricing and check out operations may be enlarged. Users may be allowed to customize and/or update their display profile to designate preferences for types of content and adjust how content is displayed in different activities and situations. In some embodiments, the system may learn a user's display preference based on the user's interaction with a display. For example, the user may operate the display to zoom in or scroll to particular portion of a content, which indicates that the user prefers that portion of the content. The system may learn of the user's preference and may automatically enlarge or center on that portion of the content the next time the content is displayed. The display profile may be stored at one or more of the user device 110, content server 140, and payment provider server 170.

Thus, process 300 may set up the system for implementing movement based display interface. In particular, the system may determine the movement or motion detection capabilities of the user 105's devices, such as wearable devices or personal devices. The system also may receive and/or determine the user 105's display preferences. The system may then generate a display profile that defines various display settings for different display devices at different levels of movements or activities.

Figure 3B:
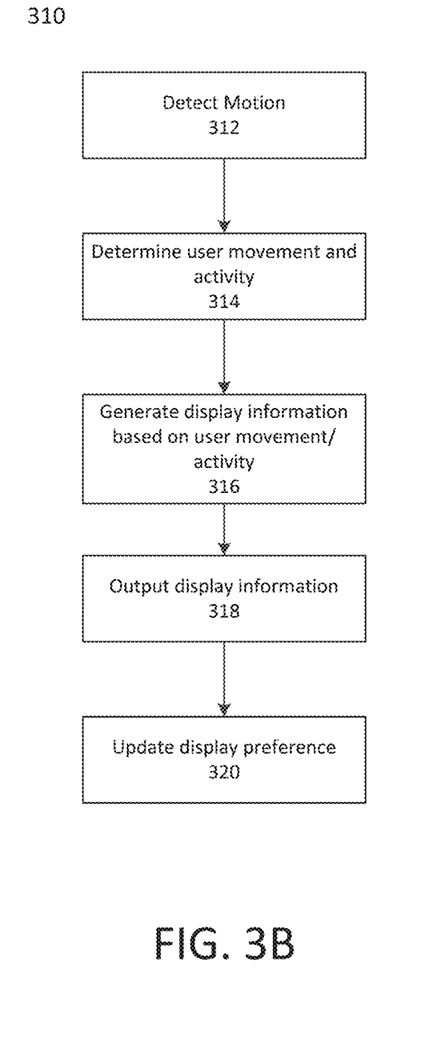
FIG. 3B is a flow chart illustrating a process for implementing movement based display interface according to one embodiment.

FIG. 3B is a flowchart illustrating a method 310 for implementing movement based display interface according to one embodiment. At step 312, the system may detect the user 105's movement and/or activity. In particular, the movement and/or activity of the user 105 may be detected by movement detection devices at the user device 110 and/or at various wearable devices or personal devices of the user 105. For example, the wearable device 1 may be a smart watch worn on the left wrist of the user 105. The smart watch may include an accelerometer and a gyroscope for detecting movement and gestures made by the user 105's left hand. The smart watch also may include biometric sensors, such as a heartbeat sensor, body temperature sensor, skin conductance sensor, and the like, that are configured to detect various biometric information about the user 105. The biometric information may be used to determine and provide context to the user 105's movement and activity. For example, the system may determine that the user 105 is exercising if the user 105 has high heart rate, high body temperature, and sweaty (skin conductance sensing).

In some embodiments, the user device 110 may detect the speed, direction, and/or acceleration of the user 105, via location detection devices, such as a GPS. In an embodiment, the speed and direction of the user 105 may be detected at the personal device 2 which is connected to the user device 110. The personal device 2 may be one or more of a GPS or a console of the user 105's car. Accordingly, the various sensor data from various sensor devices may be collected for determining the user 105's movement and activity.

At step 314, the system may determine the user 105's movement and activity. As noted above, the system may determine the user 105's movement and activity based on various sensor data collected from sensor devices carried by or worn by the user 105. The user device 110 may have a GPS or other location detection device configured to monitor and track the location and movement of the user 105. If the user 105 is relatively still, the system may determine that the user 105 is at rest and is capable of viewing or reading from a display. If the user 105 is moving at a higher rate of speed, the user 105's ability to view or read from a display may decrease as the speed increases. For example, the user 105's ability to view or read from a display may decrease when the user 105 goes from walking to running.

The system may determine that the user 105 is walking when the GPS sensing device carried by the user 105 detects that the user 105 is moving at a walking speed (e.g., between 2 to 5 miles per hour (mph)). Further, the wearable device worn on the user 105's wrist may detect a slow swing as the user 105 swings his or her arm to walk. Other devices carried by the user 105 may also detect the user 105's pace having a rhythm typical to a person walking, such as a subtle up-and-down movement when the user 105 takes steps. Other biometric sensors may detect a slight elevation in heartbeat, body temperature, and the like, that are typical biometric signs of a person walking. Thus, the system may determine that the user 105 is walking based on the speed, movement, and other biometric information detected by various sensor devices carried or worn by the user 105.

The system may determine that the user 105 is jogging or running when the GPS sensing device carried by the user 105 detects that the user 105 is moving at a jogging or running speed (e.g., between 5 to 15 mph). Further, the wearable device worn on the user 105's wrist may detect a fast swing as the user 105 swings his or her arm to jog or run. Other devices carried by the user 105 may also detect the user 105's pace having a rhythm typical to a person jogging or running, such as a quick up-and-down movement when the user 105 jogs or runs. Other biometric sensors may detect a significant elevation in heartbeat, body temperature, and the like, that are typical biometric signs of a person jogging or running. Thus, the system may determine that the user 105 is jogging or running based on the speed, movement, and other biometric information detected by various sensor devices carried or worn by the user 105.

The system may determine that the user 105 is biking when the GPS sensing device carried by the user 105 detects that the user 105 is moving at a cycling speed (e.g., above 10 mph) and/or the device is fairly steady (e.g., not a lot of up and down motion). Further, the system may detect that the user 105 is moving along a bike path or a bike lane along a road. Other devices carried by the user 105 may also detect the user 105's pace having a rhythm typical to a person cycling, such as a subtle up-and-down movement when the user 105 is pedaling. Other biometric sensors may detect an elevation in heartbeat, body temperature, and the like, that are typical biometric signs of a person biking. Thus, the system may determine that the user 105 is biking based on the speed, movement, and other biometric information detected by various sensor devices carried or worn by the user 105.

The system may determine that the user 105 is walking or running on a treadmill when the GPS sensing device carried by the user 105 detects that the user 105 is stationary, but the wearable device worn on the user 105's wrist detects a swing as the user 105 swings his or her arm to walk or run. Other devices carried by the user 105 may also detect the user 105's pace having a rhythm typical to a person walking or running, such as an up-and-down movement when the user 105 takes steps. Other biometric sensors may detect an elevation in heartbeat, body temperature, and the like, that are typical biometric signs of a person walking or running. Thus, the system may determine that the user 105 is using a treadmill to run or walk based on the speed, movement, and other biometric information detected by various sensor devices carried or worn by the user 105.

The system may determine that the user 105 is in a vehicle, such as a car or a bus, when the GPS sensing device carried by the user 105 or the car console connected to user device 110 indicates that the user 105 is moving at a greater speed (e.g., above 25 mph). Other biometric sensors may detect no elevation in heartbeat, body temperature, and the like, that are typical biometric signs of a person sitting at rest in a vehicle. Thus, the system may determine that the user 105 is traveling in a vehicle based on the speed, movement, and other biometric information detected by various sensor devices carried or worn by the user 105.

The system also may detect other movement or activity of the user 105 based on the various sensors carried or worn by the user or other devices connected to user device 110. For example, the system may determine that the user 105 is flying in an airplane or is hiking or climbing up or down a stair, based on the barometer sensor. The system also may determine detect that the user 105 is in a hurry, on the run, or other situations in which the user 105 has a shorter attention span for viewing or reading from a display.

At step 316, the system may generate display information based on the detected movement or activity. The system may generate display information based on the user 105's display preferences, as indicated in the user 105's display profile. In particular, the system may generate different display information for different levels of movements or activities. The system may change the text size, image size, information content, color, format, and other information of the display information based on the user 105's ability to view a display during the detected movement or activity. In addition, the user 105's ability to view the display also may depend on the type and size of the display the user 105 is attempting to view. Note that in some embodiments, a location of the user is also used to determine display information, such that even if movement is the same, the display may be different. For example, if a user is detected as being on a bus, boat, car, or other moving vehicle, but the user is a passenger (as opposed to a driver), more content may be provided in a smaller format because even though the speed, acceleration, and the like are the same, the passenger user can focus more on the content than a driver user.

In some embodiments, the system may calculate or determine a viewing capability score that indicates the user 105's ability to read or view a display. The viewing capability score may be calculated by weighing various factors, such as the speed of the user 105, the movement or activity of the user 105, the biometric readings of the user 105, the location of the user 105, the type or size of the display to be viewed by the user 105, the type of content to be viewed, and the like. A higher viewing capability score may indicate that the user 105 has more capability or availability to read or view from the display.

In an embodiment, a higher travel speed of the user 105 may decrease the viewing capability score. For example, when the user 105 is driving faster or is running or biking faster, the user 105 may have less ability or availability to read from a display. Greater movement by the user 105 may decrease the viewing capability score. For example, walking may have greater viewing capability score than running or jogging. More intense biometric readings (high heart rate, sweating, higher body temperature) may decrease the viewing capability score. For example, the user 105 may have less ability or availability to read from a display if the user 105 is worked up from an exercise. The type of display that is smaller, less vibrant (less colorful), lower resolution, or located further from the user 105's eyes may decrease the viewing capability score. For example, a small display of a smart watch may have a lower viewing capability score than a larger display of a smart phone. Further, the content to be displayed also may affect the viewing capability score. For example, content that requires special attention, such as content that contains more text, may lower the viewing capability score, as compared to content that requires less attention, such as content that has more images. When the user is on a vehicle, the amount of vibration or jerkiness detected by the user device 110 also may be used for adjusting the display information. For example, the viewing capability score may be decreased when the user 105 is on a bus with lots of jerky movement, as compared to when the user 105 is on a relatively steady moving train.

The system may generate the display information based on the user 105's ability to view or read the display, such as based on the viewing capability score. In particular, the system may adjust the text size, content amount, color, layout, input interface, and other features of the display information based on the user 105's ability to view or read the display. In an embodiment, the system may customize the display information based on the user's preferences or desires. For example, the user's preferences may be stored in the user's display profile. The system may select a preferred portion of content for display, enlargement, or may center on the preferred portion of the content automatically. In another example, the user may prefer a particular color scheme, layout, or theme and the system may automatically customize the display information based on the preferred color scheme, layout, or theme.

Figure 5A:
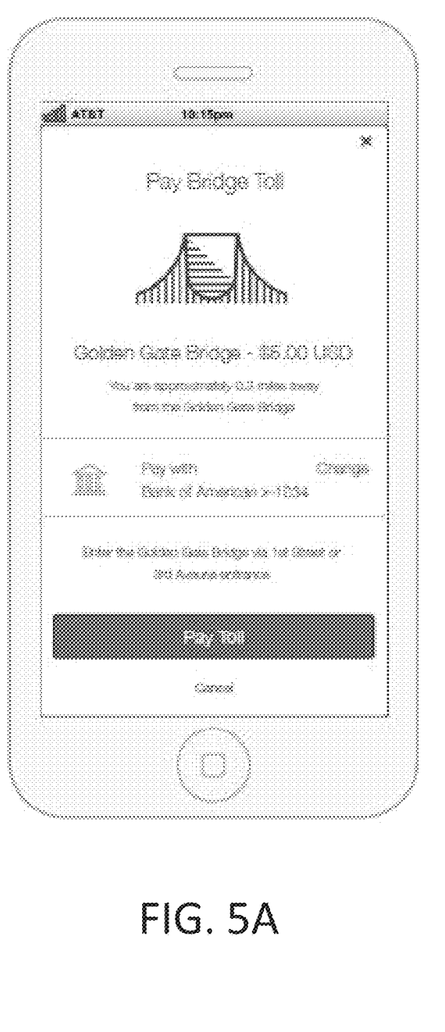
FIGS. 5A-5C illustrate display interfaces of a mobile device according to one embodiment.
Figure 5B:
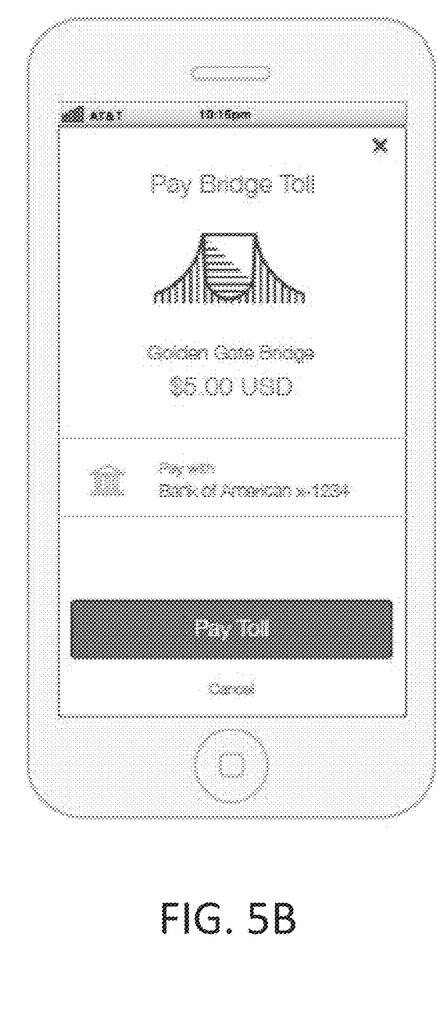
Figure 5C:
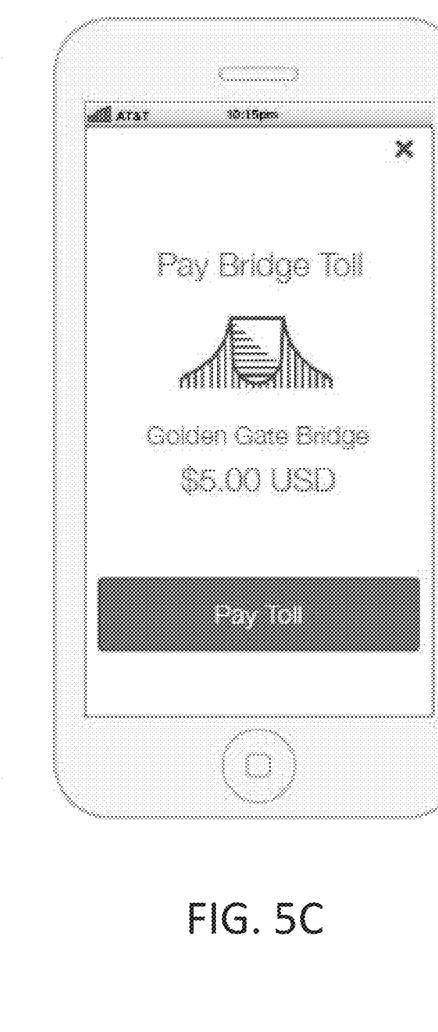

Referring to FIGS. 5A-5C that illustrate three different display interfaces on a mobile device for three different levels of movements or activities. The display information is related to paying bridge toll. The display content may be related to a payment application installed on the mobile device. The display information may be generated by the mobile device based on the movement or activity of the user 105 detected by the mobile device and/or other devices connected to the mobile device. In some embodiments, the display information may be generated by the payment provider server 170 and communicated to the mobile device to be displayed at the mobile device. For example, the detected movement or activity of the user 105 may be communicated to the payment provider server 170 and the payment provider server may generate the display information based on the detected movement or activity of the user 105.

As shown in FIG. 5A, a subject matter "Pay Bridge Toll" is displayed with an image of the bridge. The description includes the payment amount: "Golden Gate Bridge—$5.00 USD" and the direction to the payment location "You are approximately 0.3 miles away from the Golden Gate Bridge. The display information also includes a method of payment "Pay with Bank of American x-1234" and an option for changing the method of payment. Detail direction for reaching the payment location also is provided: "Enter the Golden Gate Bridge via 1st Street or $3^{rd}$ Avenue entrance. A button "Pay Toll" is provided for the user to execute payment and a "cancel" button is provided for the user to cancel the payment process. Thus, the display information notifies the user of the upcoming toll payment and allows the user to pay toll via the mobile device. The display information in FIG. 5A may be selected for display to the user when the user has more ability to view and read the display on the mobile device, such as when the user is at rest, a passenger in a car, or moving a lower speed.

FIG. 5B illustrates similar display information for paying bridge toll but is modified for when the user has less ability to read and/or operate on the display on the mobile device, such as when the user is moving at moderate speed, driving, or has moderate movement or activity. As shown in FIG. 5B, the text size for the payment amount "$5.00 USD" is enlarged. Further, directions to the payment location are no longer displayed. In addition, the text size for the method payment "Bank of America" is also enlarged and no option is provided to change the method of payment. The button "Pay Toll" also is enlarged. This allows the user quickly see the important information of payment amount and method of payment. Option to change the payment method is not provided assuming that the user does not have time or is not available to change the method of payment. Further, the button to execute payment is enlarged to allow the user to easily press or touch the button. Accordingly, FIG. 5B illustrates a payment screen for the user when the user does not have much time or ability to read and operate the mobile device to make payment.

FIG. 5C illustrates similar display information for paying bridge toll bus is modified further for when the user has minimal ability to read and/or operate on the display of the mobile device, such as when the user is moving at relatively fast speed, on a bumpy road, or has high movement or activity. As shown in FIG. 5C, the description "Pay Bridge Toll" is further enlarged with only the payment subject matter and the payment amount displayed in larger fonts. The direction to the payment location and the method of payment are not displayed. Rather, only a further enlarged button "Pay Toll" is provided for the user to execute payment. Thus, FIG. 5C illustrates a payment screen for the user when the user has minimal time or ability to read and operate the mobile device to make payment.

The system may select from one of the three payment screens for display to the user 105 based on the user 105's movement and activity detected by sensor devices carried by or worn by the user 105. In some embodiments, the system may select one of the three payment screens based on the viewing capability score. For example, if the capability score is equal to or above a first threshold indicating that the user 105 has good availability or ability to view and/or operate the mobile device, the first screen in FIG. 5A is selected. If the viewing capability score is less than the first threshold but is equal to or above a second threshold indicating that the user 105 has moderate availability or ability to view and/or operate the mobile device, the second scree in FIG. 5B is selected. If the viewing capability score is less than the second threshold indicating that the user 105 has minimal availability or ability to view and/or operate the display on the mobile device, the third screen in FIG. 5C is selected.

Figure 6A:
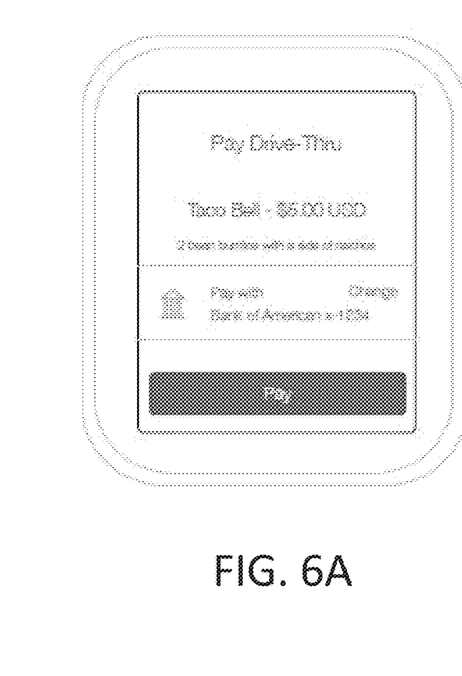
FIGS. 6A-6C illustrate display interfaces of a wearable device according to one embodiment.
Figure 6B:
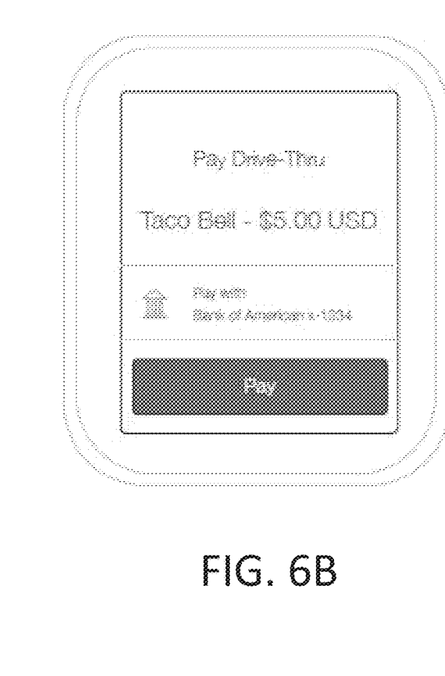
Figure 6C:
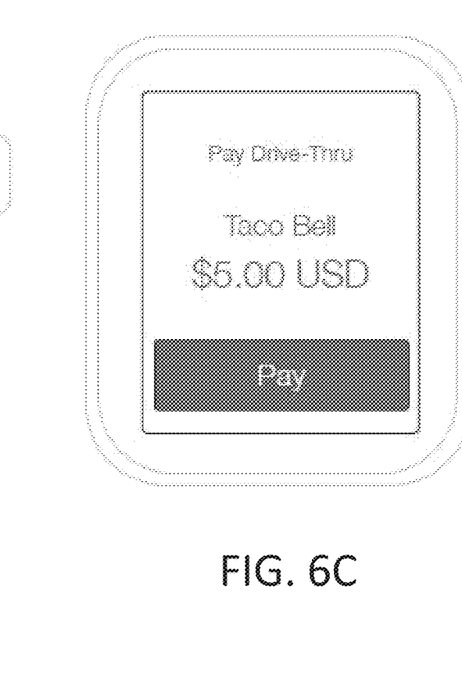

Referring to FIGS. 6A-6C that illustrate three different display interfaces on a wearable device, such as a smart watch, for three different levels of movements or activities. The display information is related to making payment at a restaurant drive thru. The display content may be related to a payment application installed on the wearable device 1. The display information may be generated by the wearable device based on the movement or activity of the user 105 detected by the wearable device 1, the user device 110 and/or other devices connected to the user device 110. In some embodiments, the display information may be generated by the payment provider server 170 and communicated to the user device 110 to be displayed at the wearable device 1. For example, the detected movement or activity of the user 105 may be communicated to the payment provider server 170 and the payment provider server 170 may generate the display information based on the detected movement or activity of the user 105. The display information then may be communicated from the payment provider server 170 to the user device 110 and then to the wearable device 1 to be displayed.

As shown in FIG. 6A, a subject matter "Pay Drive-Thru" is displayed with the merchant (payee) and payment amount: "Taco Bell—$5.00 USD" and the items to be purchased "2 bean burritos with a side of nachos." The display information also includes a method of payment "Pay with Bank of American x-1234" and an option for changing the method of payment. A "Pay" button also is provided that allows the user 105 to execute payment. Thus, the payment screen allows the user to make payment via the wearable device q. The display information in FIG. 6A may be selected for display to the user when the user has more ability to view and read the display on the mobile device, such as when the user is at rest, a passenger, or moving at a lower speed.

FIG. 6B illustrates similar display information for making a drive thru payment but is modified for when the user has less ability to read and/or operate on the display on the mobile device, such as when the user is moving at moderate speed, a passenger, or has moderate movement or activity. As shown in FIG. 6B, the text size for the payee and the payment amount "Taco Bell—$5.00 USD" is enlarged. Further, no option is provided to change the method of payment. The "Pay" button also is enlarged. This allows the user quickly see the important information of payment amount and method of payment. Option to change the payment method is not provided assuming that the user does not have time or is not available to change the method of payment. Further, the "Pay" button to execute payment is enlarged to allow the user to easily press or touch the button. Accordingly, FIG. 6B illustrates a payment screen for the user when the user does not have much time or ability to read and operate the mobile device to make payment.

FIG. 6C illustrates similar display information for paying at drive-thru but is modified further for when the user has minimal ability to read and/or operate on the display of the mobile device, such as when the user is moving at relatively fast speed, on a bumpy road, or has high movement or activity. As shown in FIG. 6C, the payee and the payment amount is further enlarged. A further enlarged "Pay" is provided for the user to execute payment. Thus, FIG. 6C illustrates a payment screen for the user when the user has minimal time or ability to read and operate the wearable device to make payment.

The system may select from one of the three payment screens for display to the user 105 based on the user 105's movement and activity detected by sensor devices carried by or worn by the user 105. In some embodiments, the system may select one of the three payment screens based on the viewing capability score. For example, if the capability score is equal to or above a first threshold indicating that the user 105 has good availability or ability to view and/or operate the wearable device, the first screen in FIG. 6A is selected. If the viewing capability score is less than the first threshold but is equal to or above a second threshold indicating that the user 105 has moderate availability or ability to view and/or operate the wearable device, the second scree in FIG. 6B is selected. If the viewing capability score is less than the second threshold indicating that the user 105 has minimal availability or ability to view and/or operate the display on the wearable device, the third screen in FIG. 6C is selected.

As noted above, the system may change the text size and content of the display information based on the movement and/or activity of the user 105. In some embodiments, the system may change the color scheme, such as color contrast between the text and the background, to make the display information easier to read. In some embodiments, the system may change the content and layout of the display, such as images, operational buttons, and the like. For example, a user is using a smart watch to stream music to the user's headphone while jogging. When the user is jogging at a brisk speed, the display interface may display only the play, pause, and skip functionality. When the user is stopped and is at rest, the display interface may display the play, pause, and skip functionality as well as artist name, song name, and artist related art.

At step 318, the system may output display information via the selected display device for viewing. In some embodiments, while the user 105 is viewing the display, the system may continue to evaluate the movement and activity of the user 105 and may change the display information accordingly. For example, the user 105 may use a navigation application on the car console when driving. As the user 105's driving speed changes, the display may change accordingly. When the user 105 is driving at lower speed, the display may provide more detailed information. When the user 105 is driving at higher speed, the display may provide brief information to help the user 105 stay focused on the road. In some embodiments, the system may determine that the user 105 has no ability or availability to view or read the display and may shut down the display. This may occur when the system determines that the user 105 should not be viewing or reading from the display for safety reasons. The system may switch to audio directions or instructions instead.

At step 320, the system may update display preferences for the user 105. In particular, the system may monitor the user 105's interaction with the display device and may determine whether the display preferences should be updated. For example, if the user 105 performs operations such as zooming in or text size changes at the display indicating that the user 105 is having difficulty viewing or reading the display, the system may learn and remember to automatically change the text size or display information to the user 105's desired setting in similar situations next time. Thus, the system may continuously learn and update the user 105's display preferences.

In an embodiment, the methods 300 and 310 may be implemented at user device 110. In some embodiments, the methods 300 and 310 may be implemented by content server 140 or payment provider server 170. For example, the display information may be generated at the content server 140 or payment provider server 170 and may be communicated to the user device 110, the wearable device 1, or the personal device 2, to be displayed.

Figure 4:
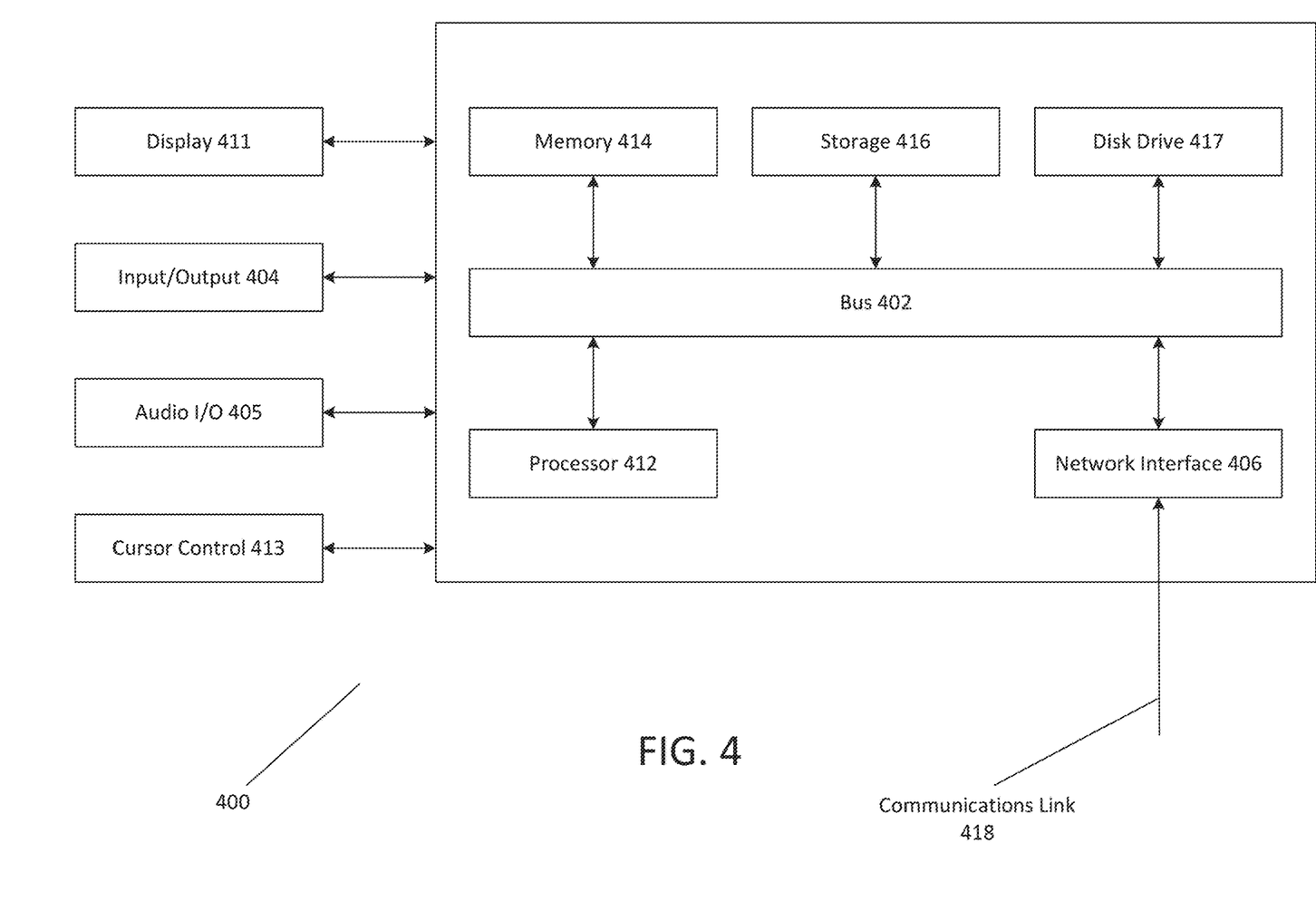
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, Bluetooth device, key FOB, badge, wearable computing device, etc.) capable of communicating with the network. The merchant and/or payment provider may utilize a network-computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.).

An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   detecting, via a first sensor of a first mobile device of a first user, a movement of the first mobile device while visual content is being displayed on the first mobile device;
   determining a viewing capability score indicating an ability of the first user to view the displayed visual content on the first mobile device;
   comparing the viewing capability score with at least a first threshold and a second threshold;
   accessing a first user profile of the first user, the first user profile indicating an interest of the first user in a first portion of the visual content;
   causing, based at least on the comparing, the first mobile device to automatically enlarge the first portion of the visual content by a first amount while removing a second portion of the visual content that is outside the first portion, or to automatically enlarge the first portion of the visual content by a second amount greater than the first amount while removing the second portion and a third portion of the visual content that is outside the first portion;
   detecting, via a second sensor of a second mobile device of a second user, a movement of the second mobile device while visual content is being displayed on the second mobile device, wherein the visual content displayed on the second mobile device is a same visual content previously or currently displayed on the first mobile device;
   accessing a second user profile of the second user, the second user profile indicating an interest of the second user in a fifth portion of the visual content that is different from the first portion; and
   causing, based on the movement of the second mobile device and the accessing of the second user profile, the second mobile device to automatically enlarge a display of the fifth portion of the visual content.

2. The method of claim 1, wherein a size of at least a fourth portion of the visual content different from the first, second, and third portions remains a same size in response to the first portion of the visual content being caused to automatically enlarge.

3. The method of claim 1, further comprising determining a screen size of the first mobile device, wherein the causing the first mobile device to automatically enlarge the first portion of the visual content is performed only when the determined screen size is smaller than a predefined screen size.

4. The method of claim 1, wherein the visual content is displayed via a webpage or a mobile application.

5. The method of claim 1, wherein the first sensor comprises an accelerometer or a gyroscope.

6. The method of claim 1, wherein the first sensor comprises a biometric sensor, and wherein the method further comprises:
   detecting, via the biometric sensor, a change in biometric data of the first user; and
   determining, based on the movement of the first mobile device and the change in the biometric data of the first user, the first user is engaging in a physical activity.

7. The method of claim 6, wherein the physical activity comprises one of walking, running, jogging, or biking.

8. The method of claim 1, wherein the movement of the first mobile device comprises a speed of the first mobile device, and wherein the first portion of the visual content is enlarged more as the speed increases.

9. The method of claim 1, wherein the movement of the first mobile device comprises a vibration of the first mobile device, and wherein a size of an enlargement of the first portion of the visual content is based on an amount of the vibration.

10. The method of claim 1, wherein the first mobile device comprises a smartphone or a wearable device.

11. A system comprising:
    a non-transitory memory; and
    one or more hardware processors coupled to the non-transitory memory and configured to read instructions from the non-transitory memory to cause the system to perform operations comprising:
       receiving sensor data from one or more sensors of a mobile device of a user while visual content is shown on a screen of the mobile device;
       determining, based on the received sensor data, that the user is engaging in a physical activity;
       accessing a user profile of the user;
       determining, based on the user profile, that the user has a greater interest in a first aspect of the visual content than other aspects of the visual content;
       determining a viewing capability score indicating an ability of the user to view the visual content on the mobile device;
       comparing the viewing capability score with at least a first threshold and a second threshold;
       in response to the viewing capability score being less than the first threshold but greater than or equal to the second threshold, causing the mobile device to automatically enlarge the first aspect of the visual content to a first size while removing a second aspect of the visual content that is different from the first aspect;
       determining, after the first aspect of the visual content has been automatically enlarged to the first size, that the viewing capability score has changed and is now less than the second threshold; and in response to the determining that the viewing capability score has changed and is now less than the second threshold, causing the mobile device to automatically enlarge the first aspect of the visual content to a second size while removing the second aspect and a third aspect of the visual content that is different from the first aspect or the second aspect, wherein the second size is greater than the first size.

12. The system of claim 11, wherein the operations further comprise determining a size of the screen, wherein the causing is performed in response to the size of the screen being smaller than a predefined screen size.

13. The system of claim 11, wherein the visual content is displayed via a webpage or a mobile application.

14. The system of claim 11, wherein the one or more sensors comprise at least one of an accelerometer, a gyroscope, or a biometric sensor.

15. The system of claim 14, wherein the received sensor data comprises movement data of the mobile device or biometric change data of the user, and wherein the physical activity comprises one of walking, running, jogging, or biking.

16. The system of claim 11, wherein
the received sensor data comprises speed data of the mobile device, and wherein
an amount of an enlargement of the first aspect of the visual is based on the speed data.

17. The system of claim 11, wherein
the received sensor data comprises vibration data of the mobile device, and wherein
an amount of an enlargement of the first aspect of the visual is based on the vibration data.

18. A non-transitory machine-readable medium having stored thereon machine-readable instructions executable to cause a machine to perform operations comprising:
accessing sensor data from one or more sensors of a mobile device of a user while visual content is shown on a screen of the mobile device, the mobile device comprising a smartphone or a wearable device, the one or more sensors comprising an accelerometer, a gyroscope, or a biometric sensor;

determining, based on the sensor data, that the user is walking, running, jogging, or biking;

determining, based on preferences previously associated with the user, that the user is more interested in a first aspect of the visual content than a rest of the visual content;

determining a viewing capability score indicating an ability of the user to view the visual content on the mobile device;

comparing the viewing capability score with at least a first threshold and a second threshold;

in response to the viewing capability score being less than the first threshold but greater than or equal to the second threshold, causing the mobile device to automatically enlarge the first aspect of the visual content by a first factor while hiding a second aspect of the visual content that is different from the first aspect;

determining, after the first aspect of the visual content has been automatically enlarged to the first size, that the viewing capability score has changed to a new viewing capability score that is less than the second threshold; and in response to the determining that the viewing capability score is less than the second threshold, causing the mobile device to automatically enlarge the first aspect of the visual content by a second factor while hiding the second aspect and a third aspect of the visual content that is different from the first aspect and the second aspect, wherein the second factor is greater than the first factor.

19. The non-transitory machine-readable medium of claim 18, wherein:
the sensor data comprises speed data or vibration data of the mobile device; and
an amount of an enlargement of the first aspect of the visual content is based on the speed data or the vibration data.

20. The non-transitory machine-readable medium of claim 18, wherein the visual content is shown on the screen of the mobile device via a webpage or a mobile application.

* * * * *